United States Patent [19]

Saijó et al.

[11] 4,124,677

[45] Nov. 7, 1978

[54] METHOD OF MANUFACTURING POLYVINYL ALCOHOL FILMS ORIENTED IN TWO ORTHOGONAL DIRECTIONS

[75] Inventors: Hiromu Saijó, Sunto; Shigeru Miyazaki, Numazu; Koichi Kanazawa, Numazu; Nobuhide Tomura, Numazu; Toshihiro Ozawa, Fuji, all of Japan

[73] Assignee: Toshiba Kikai Kabushiki Kaisha, Tokyo, Japan

[21] Appl. No.: 747,785

[22] Filed: Dec. 6, 1976

[30] Foreign Application Priority Data

Dec. 9, 1975 [JP] Japan .................. 50-145910

[51] Int. Cl.$^2$ ........................... B29C 17/02
[52] U.S. Cl. ..................... 264/289; 264/185
[58] Field of Search ............ 264/289, 210 R, 216, 264/205, 185

[56] References Cited

U.S. PATENT DOCUMENTS 3,440,316  4/1969  Miyak et al .................. 264/185

FOREIGN PATENT DOCUMENTS 38-23,336 11/1963 Japan ........................ 264/185

Primary Examiner—James B. Lowe
Attorney, Agent, or Firm—Koda and Androlia

[57] ABSTRACT

A PVA film successively oriented in two orthogonal directions is prepared by firstly elongating the film in the longitudinal direction by more than 200% while maintaining the water content $(Z \times 100)\%$ at a value of from 10 to 35% and the temperature in a range of from $(1.50/Z + 20)°$ C to 75° C. The film is then preheated while maintaining its water content at least 7%, and then elongated laterally by more than 200% at a temperature of from 45° to 110° C. Then the film is heat treated at a temperature of 110° to 210° C while permitting the film to shrink by less than 15% in the lateral direction. Finally, the film is cooled to room temperature under tension.

6 Claims, 1 Drawing Figure

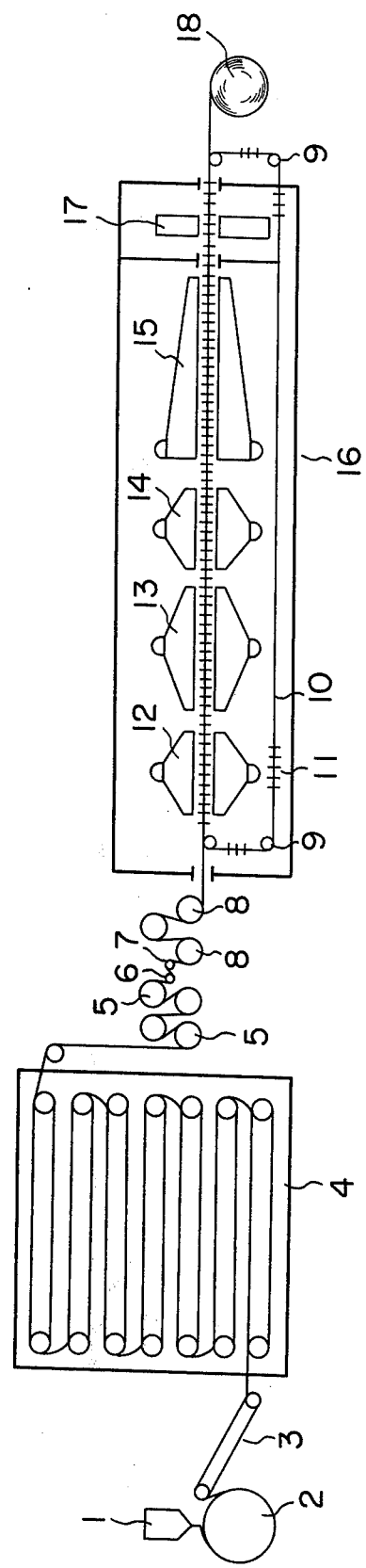

METHOD OF MANUFACTURING POLYVINYL ALCOHOL FILMS ORIENTED IN TWO ORTHOGONAL DIRECTIONS

BACKGROUND OF THE INVENTION

This invention relates to an improved method of manufacturing a polyvinyl alcohol (PVA) film.

When manufacturing a plastics film, it is subjected to elongation, usually in the longitudinal and transverse directions for the purpose of improving the physical characteristic of the film. As a consequence, it is possible to reduce the thickness of the film to a minimum value required for packing or other purposes and to increase the area and strength thus saving the cost. Such two axis elongations can be performed by simultaneously or successively elongating the film in the longitudinal and lateral directions.

Films of polymers such as stylene, polypropylene, polyester, etc., are generally subjected to successive elongations and manufactured in a large scale. However, when a polyamide film is elongated successively along two axes the film tends to crystallize greatly during the longitudinal elongation and strong hydrogen bonds are formed by amide radicals. Such crystallization and bonding make it difficult to elongate. For this reason, the successive two axis elongation process is not suitable for such polyamides and simultaneous two axis elongation process as disclosed in Japanese utility model publication No. 17197 of 1963 has been actually used in which a pantograph type link mechanism including clips for clamping the edges of the film is used. Similar to polyamides polyvinyl alcohols also contain hydroxyl groups in the molecular chains so that strong hydrogen bonds are formed as the crystallization proceeds due to elongation. Accordingly, it is extremely difficult to apply the successive two axis elongation process to PVA and the simultaneous two axis elongation process has been used.

However, a simultaneous two axis elongating machine is constructed such that the side edges of a film are clamped by a plurality of clips, that the longitudinal spacing between adjacent clips are increased during running to elongate the film in the longitudinal direction and that simultaneously the clips are moved in the lateral direction to elongate the film in the lateral direction. Accordingly, such machine is not only complicated and expensive but also difficult to operate and maintain. Moreover, as the pantograph type endless link mechanism for controlling the movement of the clips is elaborate and complicated it is not suitable for high speed running. Thus, its production speed is low. Accordingly, such machine cannot be used economically for the preparation of thin PVA films resembling cellophane films, and it has long been desired to provide an improved successive two axis elongation process that can use an inexpensive roller type longitudinal elongating machine and a clip type lateral elongating machine having high production speed.

When manufacturing PVA films, it is difficult to manufacture them at high speeds without elongation so that semi-molten method is now used most widely because of its high production speed wherein PVA is dissolved in water at about 140° C. to form an aqueous solution having a concentration of about 50%, the solution is then caused to flow onto a roller or a belt through a narrow slit and then dried to form a film. This method, however, involves such steps as transferring, peeling and drying which hinder high production speed. Thus, the production speed is limited by a slow drying speed for thick films and difficulty in the transfer and peeling of thin films. Such problems increase the cost of the PVA films. Yet due to their low tendency of being charged with electric charge, and good printing property they are formed as relatively thick films by incorporating a suitable amount of a plasticizer and without subjecting to any elongation treatment, such thick films having been used to pack fabrics or other fiber products. PVA films have the highest resistance against oxygen permeation among various plastics so that they are suitble for packing fragrant things. In addition, they are highly transparent and have good printing property. For this reason, when subjected to two axis elongation process, the PVA films increase transparency and have high mechanical characteristics, especially increased stiffness. Accordingly, even when their thickness is decreased they can be used as an efficient packing material. High moisture absorving property, the most serious defect of the PVA films intended for use as packing material, can be prevented by applying a thin coating of a water resistant polymer on the surface of the PVA films.

PVA films prepared by simultaneous two axis elongation process have well balanced physical properties which is highly evaluated in the art. If the simultaneous two axis elongation process could be applied for the production of this PVA films at high efficiency this process would be the best. In any event, it has been desired to develope an efficient method capable of economically preparing thin two axis elongated PVA films not containing or containing a small amount of plasticizer suitable for use as packing material.

SUMMARY OF THE INVENTION

It is an object of this invention to provide a novel successive two axis elongation process capable of preparing PVA films at low cost and at high production speed with simple apparatus.

Another object of this invention is to provide a method of preparing thin elongated PVA films by using well known successive two axis elongating apparatus.

Generally stated, the successive two axis elongation method of PVA of this invention comprises the steps of longitudinary elongating a blank PVA film prepared from a PVA aqueous solution in a low temperature drying section at a relatively low temperature and in a relatively high humidity region while preventing crystallization which renders difficult the transverse elongation, elongating transversely, evaporating off remaining moisture in a high temperature drying section, and finally heat treating the elongated film.

According to this invention, there is provided a method of manufacturing a polyvinyl alcohol film successively oriented in two orthogonal directions by using a roller type longitudinal elongation machine and a clip type lateral elongation machine, characterized in that the method comprises the steps of longitudinally elongating the film by more than 200% while maintaining the initial water content $(Z \times 100)\%$ of the film at a value of from 10 to 35% (where Z represents a value obtained by dividing the weight of the water (W) contained in the film having a weight of (P+W) by the weight of the dry film (P) (i.e., $Z = W/P$), and $(Z \times 100)\%$ represents a proportion in percent of the weight of the water contained in the film with respect to the weight of the dry film. Hereinbelow $(Z \times 100)\%$ is described as "water content."), and the temperature of the film in a range of from $(1.50/Z + 20)°$ C. to 75° C., preheating the longitudinally elongated film to a temperature lower than the temperature at which the film is elongated laterally while maintaining the water content thereof at at least 7%, by weight, laterally elongating the preheated film by more than 200% at a temperature of from 45° to 110° C. while preventing the film from shrinking longitudinally, drying and heat treating the film at a temperature of 110° to 210° C. while permitting the film to shrink by less than 15% in the lateral direction, and finally cooling the film to room temperature under tension.

In carrying the invention, the water content and elongation temperature of the PVA film are important factors. Generally speaking the water content has a great influence upon the elongation of the film. More particularly, as the water content increases, the point of secondary transition decreases rapidly at about 5%. It is presumed that this phenomenon is caused by the fact that the moisture relaxes the hydrogen bonds between the molecules of PVA, thus increasing the mobility of the molecules. For this reason, the lateral elongation can be made readily by decreasing as far as possible the temperature of longitudinal elongation and maintaining the water content at a relatively high percentage for the purpose of preventing crystallization.

The result of our measurement showed that a preferred initial water content of PVA films ranges from 10 to 35%, and that when the water content is less than 10%, although longitudinal elongation is possible, subsequent lateral elongation is difficult or impossible. At about 10%, two axis elongation is possible, local uneven elongation appears at a rate of one point per several squaremeters or 10 squaremeters of the elongated film, thus resulting in unstable films. The upper limit of the water content is 35%. Although it is possible to readily elongate the film, actually films having many surface defects are formed due to adhesion of the films to the rollers or some slip between them. Further, the strengths of the film in the longitudinal and lateral directions are not balanced. Accordingly, the optimum initial water content suitable for the method of this invention ranges from 10 to 35%, preferably from 15 to 30%.

The longitudinal elongation temperature is intimately related to the subsequent lateral elongation conditions. The upper limit of the longitudinal elongation temperature is less than 75° C., preferably below 70° C. When the film is elongated longitudinally at a temperature above 75° C., although the elongation itself is easy and the elongated film does not include any defect, such temperature enhances decrease in the water content and crystallization thereby resulting in non-uniform elongation during the following lateral elongation. The lower limit of the longitudinal elongation temperature is determined by the variation of the secondary transition point of the PVA film which corresponds to the water content. It was found that a temperature about 20° C. which is higher than the secondary transition point is the lower limit of the optimum longitudinal elongation temperature corresponding to the initial water content of the film. For example, considering a PVA film having a degree of polymerization of 1400 to 1700 and a saponification value of higher than 98% and is suitable for carrying out the invention, the variation in the water content at the secondary transition point determined by the rate of logarithmic attenuation of the twist stiffness at different temperatures is expressed by an equation $Tg \approx 1.50/Z$ in a range of the water content of from 10 to 35%, where $Tg$ represents the secondary transition temperature. Experimentally it may be said that a temperature about 20° higher than this temperature, that is $(1.50/Z + 20)°$ C., is the lower limit of the longitudinal elongation temperature. When the film is elongated at a temperature below this limit, the film becomes white as the percentage of the longitudinal elongation approaches the upper limit, thus causing fracture of the elongated film. For this reason, the range of the longitudinal elongation temperature is from 75° C. (upper limit) and $(1.50/Z + 20)°$ C. (lower limit), preferably from 70° C. to $(1.5/Z + 25)°$ C. Usually, the longitudinal elongation is performed within the free distance between two adjacent elongation rollers rotating at different peripheral speeds. The percentage of the longitudinal elongation according to this invention should be 200% or more, and when the percentage of elongation is less than 200%, not only the mechanical strength of the elongated film is low but also the production speed is low. The maximum percentage of elongation is about 450%.

Depending upon the field of use of the PVA film it is advantageous to coat a dispersion of a high molecular weight substance upon the surface of the PVA film after completion of the longitudinal elongation but prior to the lateral elongation. Where water is used as the dispersion medium, the water is added to the film. To efficiently carrying out the method of this invention, the PVA film supplied to the lateral elongating section including preheater should contain more than 7% of water content whether such dispersion is applied or not. Water content of less than 7% causes uneven lateral elongation. The lateral elongation is usually performed by clip type lateral elongation apparatus but in the successive elongation process, different from the simultaneous elongation process, the clips are moved in a direction perpendicular to the direction of advance of the film so that it is possible to simplify the construction of the apparatus and to increase the operating speed thereof. The lateral elongation temperature is from 45° to 110° C., preferably from 55° to 100° C. When the elongation temperature is less than 45° C. the film tends to break whereas at a temperature above 110° C., uneven elongation results.

The percentage of lateral elongation should also be higher than 200%, and elongation of less than 200% results in low mechanical strength and production speed so that preferred percentage of lateral elongation is from 200% to 450%. The purpose of the preheater is to adjust the longitudinal dimension of the film and to bring the temperature of the film to a desired elongation temperature immediately prior to the lateral elongation by adjusting the heat quantity at various portions of the film. Advantageously, the heating time should be less than 30 seconds at a temperature lower than the temperature at which the film is elongated laterally.

The PVA film elongated in two axis directions in the presence of a relatively large amount of water and at a relatively low temperature necessary for preventing crystallization has a large elasticity resembling that of rubber. However, when dried and heat treated under tension in both axial directions, the film tends to break due to contraction. For this reason, it is desirable to dry and heat treat the film while controlling the amount of lateral contraction to be less than about 15%. The melting point of a perfectly saponified PVA is generally about 230° C. Actually, however, the melting point is higher than the temperature at which pyrolysis begins so that the upper limit of the heat treating temperature is about 210° C. The low limit of the heat treating temperature generally coincides with the final elongation temperature. In this invention, however, a temperature of less than 135° C. is not sufficient to fix the dimension of the film utilized for packing purpose so that a heat treating temperature of at least 135° C. is necessary. Rapid heating degrades the quality of the film due to rapid expansion of water and certain volatile substances contained in the film. In this invention, it is rare that the drying temperature and the heat treating temperature are the same. Advantageously, the drying step is performed at a temperature of from 110° to 130° C., and the heat treating step is performed at a temperature of from 140° to 210° C. After the heat treating step, the film is cooled by air to a temperature below about 60° C. under tension.

BRIEF DESCRIPTION OF THE DRAWING

In the accompanying drawing a single FIGURE shows a diagrammatic side view of apparatus utilized to carry out the method of this invention.

DESCRIPTION OF THE PREFERRED EMBODIMENT

Referring now to the accompanying drawing a PVA aqueous solution having a concentration of about 50% by weight and sufficiently deairated is poured onto a rotary roller 2 or a belt through a slit at the bottom of a container 1 to form a continuous PVA film which is then transferred to a low temperature drying section 4 by means of a belt conveyor 3. The drying section 4 is heated to a relatively low temperature, for example 85° C., so that the water content of the film is adjusted to from 10 to 35% while the film passes through the drying section.

The film issuing from the low temperature drying section 4 is preheated by preheating rollers 5, and then elongated longitudinally by 200 to 450% between a pair of closely adjacent elongation rollers 6 and 7 rotated at different peripheral speeds. Finally, the film is cooled by cooling rollers 8. The temperatures of the preheating rollers 5 and the elongation rollers 6 and 7 are selected such that the lower limit $T_L$ of the film temperature will be $T_L = (1.50/Z + 20)°$ C. and the upper limit $T_H$ will be equal to 75° C. The temperature of the cooling rollers 8 is controlled such that the film temperature will be room temperature.

The opposite side edges of the film leaving the cooling rollers 8 are gripped by a plurality of clipps 11 mounted an endless chains or belts 10 passing about pulleys 9. At first, the film is passed through a preheater 12 and then through a lateral elongation unit 13 where the film is elongated laterally by 200 to 450% by moving the clips in the direction perpendicular to the direction of advancement of the film while maintaining the water content of the film at at least 7% and the film temperature at 110° C. for the purpose of preventing the film from shrinking in the longitudinal direction. Then, the film is passed successively through a high temperature drying unit 14 maintained at a temperature of from 110° C. to 130° C. and a heat treating until 17 maintained at a temperature of from 140° C. to 210° C. for permitting the film to shrink by less than 15% in the lateral direction. The heating of the preheating unit 12, lateral elongation unit 13, high temperature drying unit 14 and heat treating unit 15 is done by supplying to these units hot air from a source of hot air, not shown, provided on the outside of the housing 16 through umbrella shaped hoods. The film leaving the heat treating unit 15 is cooled under tension by cold air in a cooling unit 17 contained in an independent compartment and finally taken up by a take up reel 18.

Some preferred embodiments of this invention are illustrated in the following.

EXAMPLE 1

A 47% aqueous solution of a polyvinyl alcohol having an average degree of polymerization of 1700 and a saponification value of 99.8% was prepared at a temperature of 140° C.

The temperature of the solution was decreased to 94° C., and the solution was extruded through the bottom slit of the container 1 onto the roller 2 to form a continuous film. The film was then dried by the low temperature drying unit 4 to a water content of 19% to obtain a film having a width of 380 mm and a thickness of 200 microns. The film was then passed through the preheating rollers 5 at a speed of 12 m/min. and then through a pair of closely spaced elongation rolls 6 and 7 to elongate it in the longitudinal direction by about 350% at a temperature of about 60° C. The elongated film was advanced at a speed of 42m/min. by cooling rollers 8 maintained at a temperature of about 23° C. At this time, the film had a width of 345 mm, a thickness of about 60 microns and a water content of above 13%. Immediately thereafter the film was passed through the preheating unit 12 having a length of about 4 meters and then through the lateral elongation unit 13 to be elongated laterally about 320% at a temperature of 85° C. The film was passed through the high temperature drying unit 14 with its temperature adjusted to 120° C. and thence through the heat treating unit 15 maintained at a temperature of 170° C. during which the film was allowed to contract 4% in the lateral direction. Thereafter the film was cooled by cold air in the cooling unit 17 to obtain a film having a thickness of about 17 microns. After standing this film in room air at a temperature of 20° C. and a relative humidity of 65%, its characteristics were measured as follows.

| Tensile strength | |
|---|---|
| longitudinal | 22.5 kg/mm$^2$ |
| lateral | 19.8 kg/mm$^2$ |
| Elongation under tension | |
| longitudinal | 48 % |
| lateral | 61 % |

EXAMPLE 2

A 45% by weight aqueous solution of a polyvinyl alcohol having an average degree of polymerization of 1750 and a saponification value of 98% was prepared at a temperature of 140° C. The temperature of the solution was decreased to 92° C. and then a film was formed by roller 2 as in Example 1. The film was dried by the low temperature drying unit 4 to a water content of 25%. At this stage, the film had a width of 250 mm and a thickness of 135 microns. The film was then passed through the preheating rollers 5 at a speed of 20 m/min. and elongated longitudinally by the elongation rollers 6 and 7 by about 300% at a temperature of 65° C. Thereafter, the film was advanced at a speed of 60 m/min. by rollers 8 cooled to a temperature of 23° C. The longitudinally elongated film had a width of 210 mm, a thickness of about 45 microns and a water content of 15.8%. The film was then immediately advanced into the clip type lateral elongation machine 16 where the film was passed through perheater unit 12 having a length of 6m and heated to a temperature of 85° C., laterally elongated by about 300% by the lateral elongation unit 13 at a temperature of 95° C., dried by the high temperature drying unit 14 maintained at a temperature of 120° C., heat treated by the heat treating unit 15 maintained at a temperature of 185° C. during which the film was allowed to shrink 7% in the lateral direction and finally cooled by cooling unit 17 to obtain a film having a thickness of 15 microns and a width of 490 mm.

After standing the film in room air at a relative humidity of 65% and a temperature of 20° C. its characteristics were measured as follows.

| Tensile strength | |
|---|---|
| longitudinal | 21 kg/mm$^2$ |
| lateral | 17.4 kg/mm$^2$ |
| Elongation under tension | |
| longitudinal | 52 % |
| lateral | 65 % |

As above described, the invention enables successive two axis elongation of PVA films, which has been difficult heretobefore by the adjustment of the water content and the temperature of the films. The successive two axis elongation method of this invention has extremely higher production speed than the simultaneous two axis elongation method and can be performed with less expensive apparatus. Accordingly, it is possible to manufacture thin and high quality two axis elongated PVA films compatible with cellophane films and suitable for packing or other purposes.

While the invention has been shown and described with reference to a preferred embodiment, it will be clear that the apparatus utilized to carry out the invention can be modified variously.

We claim:

1. In a method of manufacturing a polyvinyl alcohol film successively oriented in two orthogonal directions by using a roller type longitudinal elongation machine and a clip type lateral elongation machine, the improvement which comprises the steps of longitudinally elongating a polyvinyl alcohol film by more than 200% while maintaining the initial water content (Z × 100)% of the film at a value of from 10 to 35%, where Z represents a value obtained by dividing the weight of the water contained in the film by the weight of the dry film, and (Z × 100)% represents a proportion in percent of the weight of the water contained in the film with respect to the weight of the dry film, and maintaining the temperature in the film in a range of from a lower limit of (1.50/Z + 20)° C. to an upper limit of 75° C., preheating the longitudinally elongated film to a temperature lower than the temperature at which the film is elongated laterally while maintaining the water content thereof at at least 7%, elongating laterally the preheated film by more than 200% at a temperature of from 45° to 110° C. while preventing the film from shrinking longitudinally, drying and heat treating the film at a temperature of 110° to 210° C. while permitting the film to cause it to shrink by less than 15% in the lateral direction, and finally cooling the film to room temperature under tension.

2. The method according to claim 1 wherein said initial water content of said film ranges from 15 to 30%, by weight.

3. The method according to claim 1 wherein said polyvinyl alcohol film has a degree of polymerization of from 1400 to 1700 and a saponification value of higher than 98%.

4. The method according to claim 1 wherein said lateral elongation is performed at a temperature of from 55° to 100° C.

5. The method according to claim 1 wherein the longitudinally elongated polyvinyl alcohol film is elongated laterally by 200 to 450%.

6. The method according to claim 1 wherein before longitudinally elongating the film, the film is dried at a relatively low temperature to have a water content of the film from 10 to 35% by weight and then preheated to a temperature of from (1.50/Z + 20)° C. to 75° C.

* * * * *